United States Patent [19]
Walter

[11] 4,136,839
[45] Jan. 30, 1979

[54] CASSETTE FOR TAPE, PARTICULARLY LIGHT-SENSITIVE TAPE

[75] Inventor: Karl Walter, Penzberg, Fed. Rep. of Germany

[73] Assignee: AGFA-Gevaert AG, Leverkusen, Fed. Rep. of Germany

[21] Appl. No.: 828,962

[22] Filed: Aug. 29, 1977

[30] Foreign Application Priority Data

Aug. 27, 1976 [DE] Fed. Rep. of Germany ....... 2638697

[51] Int. Cl.² ............................................. G03B 1/04
[52] U.S. Cl. ..................................... 242/71.1; 242/76
[58] Field of Search ................. 242/71.1, 71.7, 67.1 R, 242/76, 197, 68.5

[56] References Cited

U.S. PATENT DOCUMENTS

| 3,322,366 | 5/1967 | Hayden | 242/71.1 |
| 3,395,870 | 8/1968 | Klinger | 242/76 X |
| 3,586,258 | 6/1971 | Horlezeder | 242/71.7 |
| 4,060,210 | 11/1977 | Norris | 242/71.1 |

Primary Examiner—Edward J. McCarthy
Attorney, Agent, or Firm—Michael J. Striker

[57] ABSTRACT

A cassette housing has an inlet and accommodates in its interior a turntable provided with a tape-engaging hub. The turntable is rotatable about a normally upright axis in one direction to take tape up on the hub, and in the opposite direction to pay tape out from the hub. A pair of guide baffles guides the tape for travel between the inlet and the hub. An articulated band of curved band sections surrounds the hub over a portion of arc and rests freely slidably on the turntable so that when the same is rotated in take-up direction the articulated band contracts about the hub to urge tape on the same against the hub, whereas when the turntable is rotated in the pay-out direction the articulated band expands about the hub to recede outwardly from it so as to permit unobstructed paying-out of the tape.

13 Claims, 4 Drawing Figures

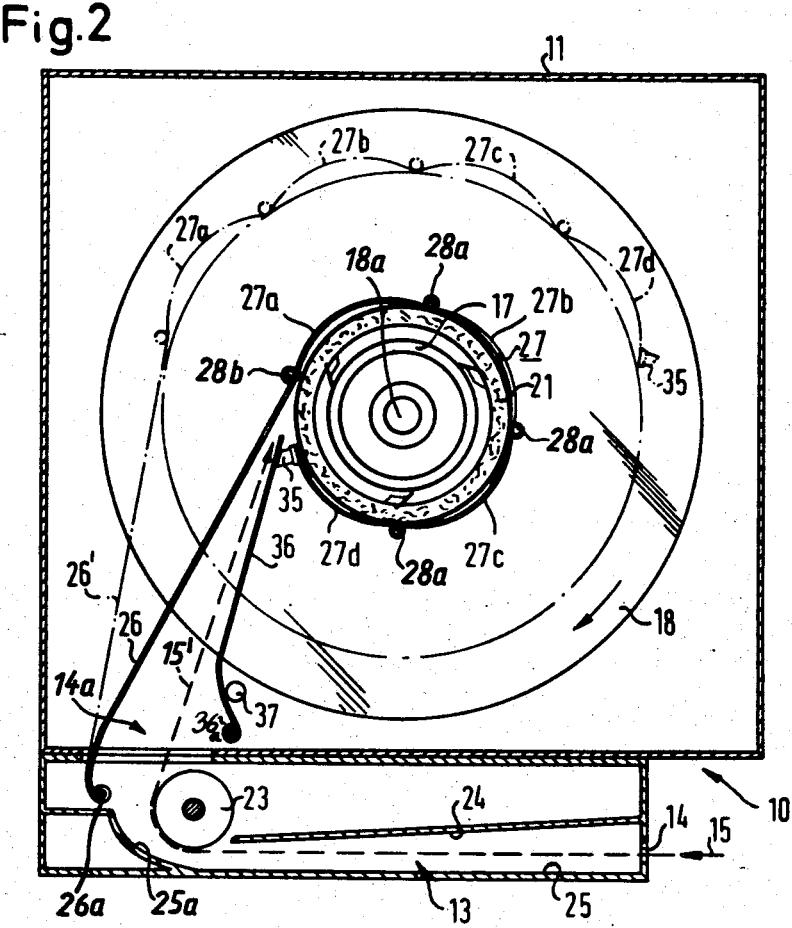
Fig.2
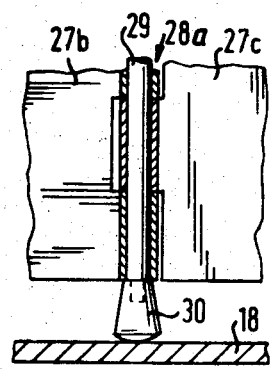
Fig.3
Fig.4

CASSETTE FOR TAPE, PARTICULARLY LIGHT-SENSITIVE TAPE

BACKGROUND OF THE INVENTION

1. Field of the Invention

The present invention relates to a cassette for tape material.

More particularly, but not exclusively, the invention relates to a cassette for light-sensitive tape material.

The terms "tape" and "tape material" are used herein in their broad sense of referring to any kind of flexible, strip-shaped sheet material.

2. The Prior Art

In many instances cassettes are required to contain light-sensitive tape material which must be protected against the access of light. For example, automatic equipment for copying of films or photos, and printing equipment for picture-to-picture copying on image-reversing photosensitive paper, requires the use of light-sensitive paper strips or tapes. For convenience of handling the rolls of paper are accommodated in so-called "daylight cassettes" i.e., cassettes which prevent any access of light to the tape in their interior. This makes it possible to insert the cassette in the machine in daylight, and also to remove it again under the same conditions.

The leading end portion (having a length of usually a few centimeters) extends out from the cassette at the time the same is inserted into the machine. This is necessary because this end portion must be threaded through the machine and inserted into an empty take-up cassette into which the tape is transferred during operation of the machine. This insertion of the leading tape end portion into the empty cassette is cumbersome and time consuming, because the empty cassette must first be opened, the tape end portion inserted into a slot in the take-up hub of the cassette (or clamped behind a spring clamp) and the cassette then be closed again.

Another type of cassette which has been proposed and which seeks to overcome the problem by having the user merely insert the tape end through a slot, whereupon it is then automatically taken up on the hub, can be used only for take-up purposes. It can not be used to subsequently pay the tape out again so that difficulties are created in retrieval of the tape from the cassette and also in terms of having to keep two different types of cassettes on hand (i.e., take-up and pay-out cassettes). Attempts to make such cassettes suitable for pay-out as well have been unsuccessful because the necessary measures raise the cost of the cassette to an economically not acceptable level.

There is a type of daylight cassette known which can be used for both take-up and pay-out. In this, an annulus of pins is located in the interior and cooperate with a similar second annulus of pins. The tape end is inserted from outside through the pins of these annuli and the latter are then displaced relative to one another until they clamp the tape end between them. This, however, is also an economically unattractice construction.

SUMMARY OF THE INVENTION

It is an object of the invention to overcome the disadvantages of the prior art.

More particularly, it is an object of the invention to provide an improved cassette, particularly a cassette for light-sensitive tape material, which avoids those disadvantages.

Another object is to provide such a cassette wherein an inserted tape end will automatically be guided to the tapewinding hub of the cassette and engaged thereon.

A concomitant object is to provide a cassette of the type in question which is of very simple and inexpensive construction.

Still a further object is to provide such a cassette which is fully or substantially free of the danger of malfunction.

Yet a further object is to provide a cassette of this type in which pay-out of the tape subsequent to the take-up thereof, proceeds without any hindrance and the tape winding on the hub is automatically released for payout.

A still further object is to provide such a cassette which is capable of operating with tapes standing on edge in a vertical or generally upright plane, and which permits the insertion of the leading tape end into the cassette and take-up of the tape onto the hub, with the tape in such vertical or upright position.

In keeping with these objects and with others which will become apparent hereafter, one aspect of the invention resides in a cassette for tape, particularly light-sensitive tape. Briefly stated, the novel cassette may comprise a housing having an inlet; a turntable in the housing and provided with a tape-engaging hub, the turntable being rotatable about a normally upright axis in one direction to take a tape up on the hub and in another direction to pay the tape out from the hub; first means for guiding a tape between the inlet and the hub; and second means surrounding the hub over a portion of arc and operable to contract about the hub in response to rotation of the turntable in the one direction so as to urge the incoming tape against the hub, and to expand about the hub in response to rotation of the turntable in the other of the directions so as to permit unobstructed payingout of the outgoing tape from the hub.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a section taken on line II—II of FIG. 1, with the cover in closed position;

FIG. 3 is a fragmentary view, partly sectioned, showing a detail of the articulated band of FIGS. 1 and 2; and, FIG. 4 is a fragmentary top-plan view showing the tape-winding hub of the cassette in FIGS. 1-3.

DESCRIPTION OF A PREFERRED EMBODIMENT

The Structure

Figure 1:
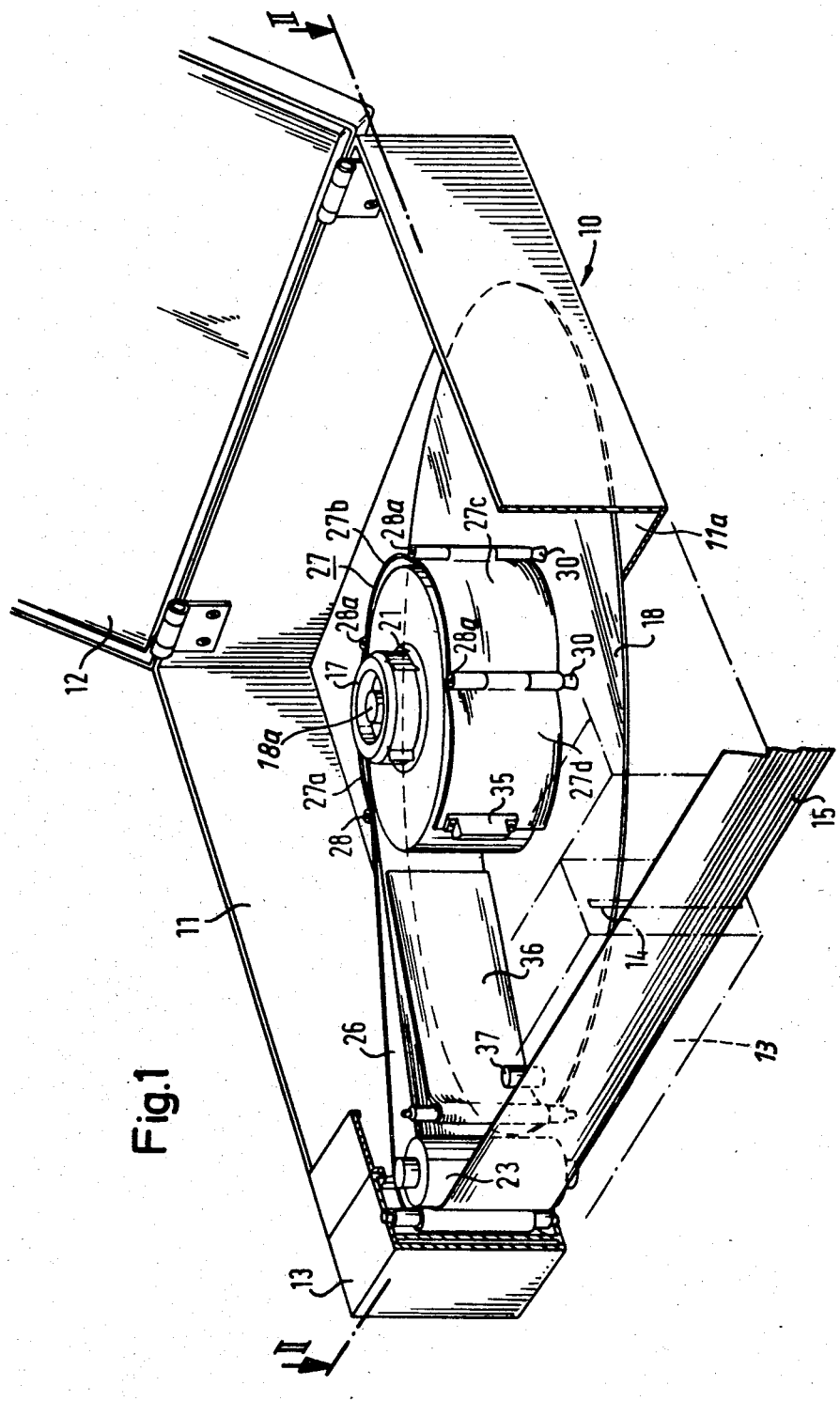
FIG. 1 is a partially sectioned top perspective view of a cassette embodying the invention, shown with its cover in open position.

A cassette according to the present invention is identified in toto with reference numeral 10 in FIGS. 1 and 2. It should be noted that although in FIG. 1 the box-shaped housing 11 is shown with its cover 12 in open position, a duct section 13 of the cover (extending along the free edge of the same) is illustrated in phantom lines in the position which it assumes when the cover 12 is in closed position (i.e., when the cassette is operative). The duct section 13 has a slot 14 through which a tape 15, particularly a light-sensitive tape such as a strip of photographic paper or the like, can enter and leave the cassette.

A turntable 18 is mounted in the housing 11, being secured (in a manner known per se and not shown) to the bottom wall 11a of housing 11 for rotation in clockwise (tape take-up) direction and alternately in anticlockwise (tape pay-out) direction, about an axis 18a which normally (i.e., during operation use of the cassette) is upright. The axis 18a may be defined by a shaft, a portion of which extends through the bottom wall 11a and is engaged by a suitable drive (know per se) which can rotate it in the respectively desired direction. The turntable 18 carries (e.g., rigidly connected to it or of one piece with it) a tape-winding hub 17 which rotates with it about the axis 18a.

The tapes 15 are not normally intended to be wound directly onto the hub 17. It is preferred, instead, to wind them on a tubular core 21 of e.g., cardboard or the like (see FIG. 4). To make this possible the circumference of hub 17 is provided with one or more entraining elements (one shown), here shown as resilient spring blades 20 having other edges which project beyond the hub 17 and which are inclined circumferentially of the hub (preferably in the take-up direction). When the core 21 is pushed onto the hub 17, these entraining elements engage the core (their outer edges press into the core if the material of the same is soft enough, e.g., cardboard) and entrain the core for rotation with the hub 17.

The purpose of the duct 13 is to prevent the entry of light into the cassette 10. It defines an internal path for the tape 15 which (see FIG. 2) is bounded by two surfaces 24 and 25. These preferably converge towards the end of duct 13 which is distal from the slot 14 and where the actual inlet 14a to the interior of housing 11 is located. Adjacent this inlet 14a, but still in duct 13, an idler roller 23 is mounted which is located opposite a curved section 25a of the surface 25. The incoming leading end of the tape 15 is guided by the surfaces 24, 25 and by cooperation of the roller 23 and curved surface portion 25a, is deflected through the inlet 14a into the interior of the housing 11.

A sheet-material guide baffle 26 is pivoted at 26a adjacent the end of the curved section 25a. It extends through the inlet 14a into housing 11 and can pivot about its pivot axis 26a between the solid-line position and the broken-line position 26'. The front (inner) end of baffle 26 is generally proximal to hub 17 and during pivoting of the baffle moves in a curved path which extends approximately through the axis 18a of turntable 18 and core 17; this assures that baffle 26 can move above turntable 18 only at one side (in FIG. 2 the left-hand side) of hub 17.

Pivoted at 28b to the inner end of baffle 26 is an articulated band composed of a plurality of arcuate (see FIG. 2) sheet-material sections, for example the sections 27a, 27b, 27c and 27d. Their width (height in FIGS. 1 and 2) is, like that of baffle 26, substantially equal to the width of the widest tape 15 which is to be used in cassette 10. The sections 27a-27d are pivotally connected to one another by means of hinges 28a which may be the same, or generally similar to, the hinge forming the pivot 28a. Each of the hinges 28a, 28b has a hinge pin 29 (shown for one of the hinges 28a in FIG. 3) a lower end portion 30 of which projects below the sections 27a-27d (and also below baffle 26) and rests freely on the turntable 18. The end portion 30 is preferably coated with (or composed of) a material having a low coefficient of friction, for example polytretra-fluoroethylene which is commercially available under the tradename "Teflon". The forward end portion of the terminal section 27d of the articulated band 27 carries a magnet (usually a permanent magnet). A second guide baffle 36 is pivoted at 36a adjacent the inlet 14a and defines a guide passage for the tape 15 with the baffle 26. It has a lesser length than that of guide baffle 26 and its freedom of pivoting in direction towards the hub is limited by a stop 37.

Guide baffle 26 and sections 27a-27d are of magnetically neutral (non-magnetizable) material. Aluminum is currently preferred, but other materials could also be used, e.g., a synthetic plastic material. Guide baffle 36 in its entirety is of magnetized (e.g., ferrous) material, or else its inner end portion is of such material or carries a layer or part of such material. In the latter case, the remainder of baffle 36, may, of course, be of nonmagnetizable material.

THE OPERATION

Let it be assumed that the cassette 10 is empty but that a core 21 has been secured on hub 17. If a tape 15 is now to be wound onto the core 21, the turnable 18 with the hub 17 (and hence the core 21) is rotated in clockwise direction. This causes the articulated band 27, which at this time may be in the broken-line position of FIG. 2 or in another position, to be entrained due to the slight friction between the turntable and the end portions 30 of hinge pins 29. The individual sections 27a-27d are taken along by the rotation, in the sense that the band 27 contracts about the hub 17 (and core 21) as these sections slide on the turntable inwardly towards as well as circumferentially (to the extent possible) of the hub 17. They assume the solid-line position shown in FIGS. 1 and 2. Since during this contraction the guide baffle 26 pivots in clockwise direction, due to its connection with band 27, it moves into abutment with the baffle 36 and shifts the same in the same direction; at the same time the baffle 36 is approached from the other direction by the terminal section 27d of band 27, whose magnet 35 attracts baffle 36 until they abut (FIG. 2). During continued rotation of the turntable 18, the baffle 36 and the band 27 remain in this position, in which the band loosely surrounds the hub 17 and the core 21.

When the leading end of a tape 15, e.g., a light-sensitive strip of photographic paper or the like, is now fed through slot 14, it is guided by surfaces 24, 25 to the roller 23 and surface position 25a where it is deflected through inlet 14a. The leading end slides along the inner surface of baffle 26 (the broken-line arrow 15' in FIG. 2 is symbolic and not intended to show the initial path of the incoming leading end) and enters between the band 27 and the outer surface of the core 21 on the hub 17. During continued advancement of band 15 and rotation of turntable 18 the tape forms first one nd then additional convolutions about the core 21; after about 1.5 to 2 convolutions have thus been formed, the tape 15 is firmly connected with the core 21 and no danger of its undesired disengagement from the core exists, so long as the turntable 18 is not turned in anticlockwise direction.

As successive convolutions of tape 15 are formed on the core 21, a tape winding or coil of constantly increasing diameter forms on the core. This pushes the band 27 outwardly, i.e., causes it to expand. Ultimately, the magnet 35 will become disengaged from baffle 36 as shown in FIG. 1; in the illustrated embodiment this will take place when about 5-10 tape convolutions have been wound onto the core 21. During further increase in the diameter of the tape winding the band 27 remains in loose sliding contact with the respectively outermost convolution of the winding (see the broken line in FIG. 2) and continues to expand — i.e., to be pushed outwardly towards the edge of the turntable 18 — as the winding diameter grows.

When the tape 15 is subsequently to be withdrawn from the winding, the turntable 18 is rotated in the opposite (i.e., anti-clockwise) direction and the tape is paid out through the duct 13 and slot 14. It is a particular advantage that during this paying-out operation the tape 15 can move freely and is not in the slightest hindered by the band 27. This results from the fact that during the anticlockwise rotation the end portions 30 of the hinge pins 29 again slide on the turntable 18, but this time outwardly towards the turntable periphery, thus keeping the band 27 out of contact with the tape 15. During the anticlockwise rotation the convolutions of the tape winding tend to loosen, and withdrawal of the tape can be effected freely and without obstruction.

The cassette according to the invention has manifold advantages. Thus, during clockwise rotation of the turntable the band 27 will contract about the core 21, irrespective of the initial position of the band on turntable 18. It will thus form a guide (with baffle 26 and core 21) for the incoming tape 15 which assures that the tape will automatically be convoluted about (and thus secured to) the core 21. On the other hand, the band 27 cannot adversely influence the subsequent formation of a tape winding on core 21, since the increasing diameter of the core will automatically cause the band to recede (expand) towards the turntable periphery in exact correspondence with the increasing diameter of the winding.

The use of low-friction material on (or for) the end portions 30 of the hinge pins 29 reduces friction, eliminates noise during operation and avoids scratching of the turntable 18. The cassette can be used to operate with tapes 15 of any desired width; it is merely necessary to select the dimensions of the various elements (e.g., height of slot 14, baffles 26, 36, band 27 and the like) that they correspond to the broadest tape width which it is contemplated to employ; tapes of any width up to the broadest contemplated width can then be used interchangeably, as desired without requiring any modification of the cassette. Furthermore, the tapes can be used standing on edge, as will be apparent from the drawing and the foregoing description.

Since the cassette can be used with equal facility for taking-up and for paying-out of tape, only one type of cassette is required for the two operations. This reduces stock-keeping requirements, especially in conjunction with the fact that each cassette can operate with tapes of different widths.

While the invention has been illustrated and described as embodied in a tape cassette for light-sensitive tape, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cassette for tape, particularly light-sensitive tape, comprising a housing having an inlet; a turntable in said housing and provided with a tape-engaging hub, said turntable being rotatable about a normally upright axis in one direction to take a tape up on said hub and in another direction to pay the tape out from said hub; first means for guiding a tape between said inlet and said hub; and second means partially circumferentially surrounding said hub and including an articulated band composed of a plurality of arcuately curved sections successive ones of which are hinged to one another and operable to contract about the hub in response to rotation of said turntable in said one direction so as to urge the incoming tape against the hub, and to expand about the hub in response to rotation of said turntable in the other of said directions so as to permit unobstructed paying-out of the outgoing tape from the hub.

2. A cassette as defined in claim 1, said second means further comprising a plurality of hinges connecting the respective successive sections to one another, and a hinge pin in each hinge extending parallel to the axis of rotation of said turntable and having a lower end portion which rests on said turntable.

3. A cassette as defined in claim 2, said first means comprising two baffles extending outwardly from said hub and being independently pivotable about respective axes which extend parallel to said upright axis and are located outwardly adjacent the periphery of said turntable, said baffles defining between themselves a passage for the tape.

4. A cassette as defined in claim 3, one of said baffles having an end portion proximal to said hub, at least a part of said end portion being of magnetizable material; and wherein said articulated band includes a terminal section provided with a magnet which attracts said end portion in response to contraction of said band and in the absence of a winding of tape on said hub.

5. A cassette as defined in claim 4, wherein said other of said baffles has an end portion remote from the pivot axis of said other baffle; said articulated band having an initial section which is pivotably connected to said end portion for pivoting movement about a pivot axis which parallels said upright axis.

6. A cassette as defined in claim 4, wherein said articulated band and the other of said baffles are of magnetically neutral material.

7. A cassette as defined in claim 6, wherein said material is aluminum.

8. A cassette as defined in claim 4, wherein said one baffle is in its entirety of magnetizable material.

9. A cassette as defined in claim 4, wherein said one baffle is a magnetically neutral material and said end portion thereof is provided with a part of magnetizable material.

10. A cassette as defined in claim 4, said housing comprising a portion forming a duct having one end provided with said inlet which communicates with the interior of the housing, and another end; and said axes of said baffles being located adjacent to said inlet.

11. A cassette for tape, particularly for light-sensitive tape, comprising a housing having an inlet; a turntable in said housing and provided with a tape engaging hub, said turntable being rotatable about a normally upright axis in one direction to take a tape up on said hub and in another direction to pay the tape out from said hub; at least one flexible element mounted on a periphery of said hub and adapted to frictionally retain a tubular tape winding core which is adapted to be pushed onto said hub; first means for guiding a tape between said inlet and said hub; and second means partially circumferentially surrounding said hub and operable to contract about the hub in response to rotation of said turntable in said one direction so as to urge the incoming tape against the hub, and to expand about the hub in response to rotation of said turntable in the other of said directions so as to permit unobstructed paying-out of the outgoing tape from the hub.

12. A cassette for tape, particularly light-sensitive tape, comprising a housing having an inlet; a turntable in said housing and provided with a tape-engaging hub, said turntable being rotatable about a normally upright axis in one direction to take a tape on said hub and in another direction to pay the tape out from said hub; a plurality of spring blades mounted on a periphery of said hub and inclined circumferentially of the same, said spring blades being adapted to frictionally retain a tubular tape winding core which is adapted to be pushed onto said hub; first means for guiding a tape between said inlet and said hub; and second means partially circumferentially surrounding said hub and operable to contract about the hub in response to rotation of said turntable in said one direction so as to urge the incoming tape against the hub, and to expand about the hub in response to rotation of said turntable in the other of said directions so as to permit unobstructed paying-out of the outgoing tape from the hub.

13. A cassette for tape, particularly light-sensitive tape, comprising a housing having an inlet; a turntable in said housing and provided with a tape-engaging hub, said turntable being rotatable about a normally upright axis in one direction to take a tape up on said hub and in another direction to pay the tape out from said hub; first means for guiding a tape between said inlet and said hub; and second means partially circumferentially surrounding said hub and operable to contract about the hub in response to rotation of said turntable in said one direction so as to urge the incoming tape against the hub, and to expand about the hub in response to rotation of said turntable in the other of said directions so as to permit unobstructed paying-out of the outgoing tape from the hub, said second means including an articulated band composed of a plurality of arcuately curved sections, and a plurality of hinges connecting successive ones of said sections to one another, each hinge including a hinge pin extending parallel to said upright axis and having a lower end resting on said turntable and at least in part composed of material having a low coefficient of friction.

* * * * *